Figure 1:
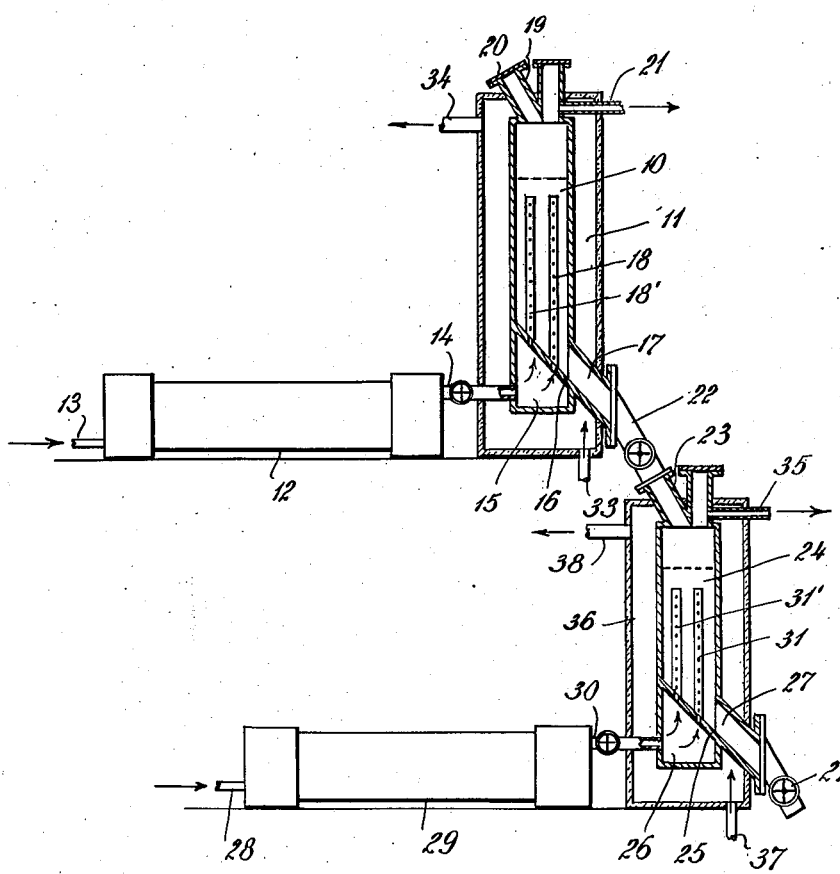

June 20, 1939.  K. B. STUART  2,162,763
ACTIVE CARBON PRODUCTION
Filed April 21, 1937   2 Sheets-Sheet 1

INVENTOR
KENNETH BARTON STUART
BY
*Pennie Davis Marvin and Edmonds*
ATTORNEYS

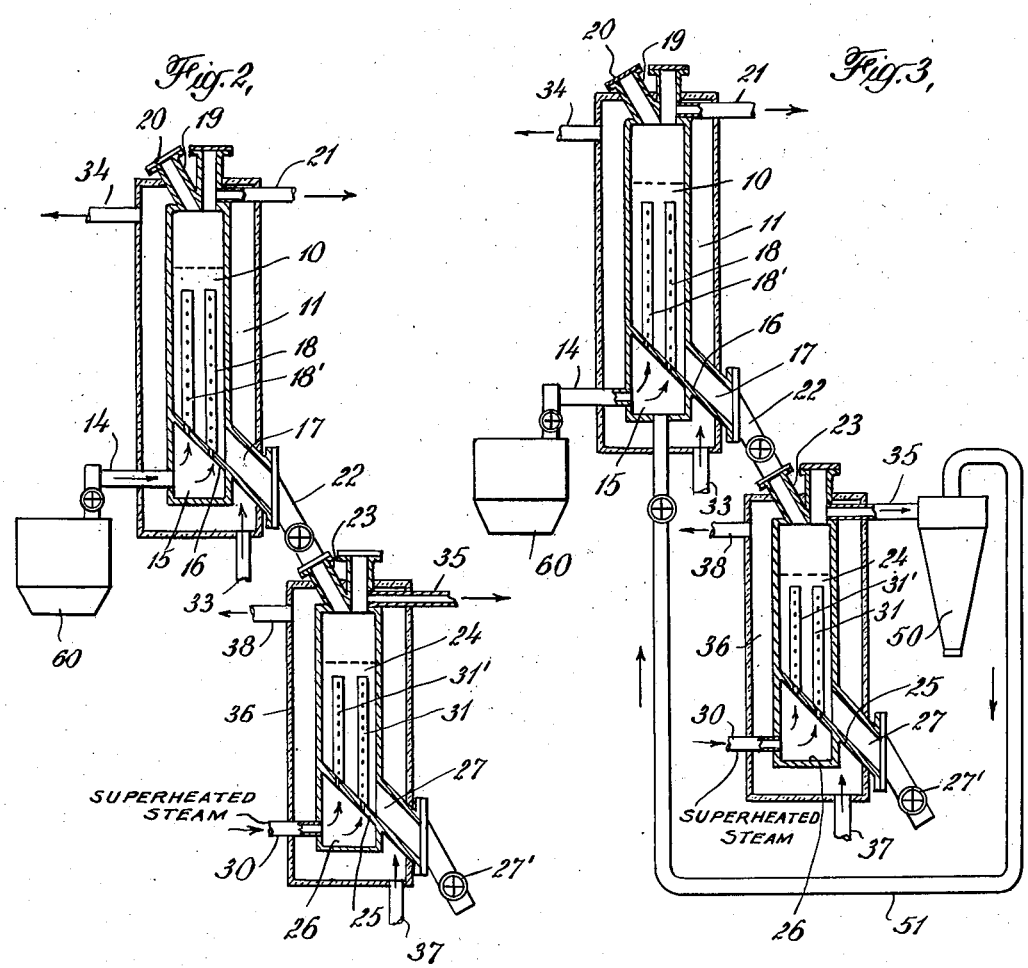

Patented June 20, 1939

2,162,763

UNITED STATES PATENT OFFICE 2,162,763

ACTIVE CARBON PRODUCTION

Kenneth Barton Stuart, Denver, Colo., assignor to The Colorado Fuel and Iron Corporation, a corporation of Colorado Application April 21, 1937, Serial No. 138,086

6 Claims. (Cl. 252—3)

This invention relates to the production of activated carbon and contemplates in particular improvements in the manufacture of activated carbon from solid carbonaceous materials involving the heating of the materials to expel volatile constituents therefrom.

Processes for the production of activated carbon usually involve the heating of carbonaceous material containing volatile matter under non-oxidizing conditions to expel volatile constituents, leaving a char containing activated or activatable carbon. The char thus formed is usually subjected to further treatment with superheated steam to increase its activity or, in other words, to activate the activatable carbon formed during the prior heating step or to remove substances adsorbed by carbon which was previously active.

In heretofore customary processes the char has been formed by placing the raw carbonaceous material in a vessel and heating it by conduction through a wall in order to expel the volatile constituents. In such prior practices (involving, as they do, indirect heating of the carbonaceous material) there is bound to be a considerable thermal gradient between different portions of the material, because carbonaceous materials are in general poor conductors of heat. Gas and vapors liberated from the distilling zone within the charge follow paths of least resistance and pass through the pores, cracks and voids of the material already carbonized and of higher temperatures lying in hotter zones within the charge. In other words, the hydrocarbons expelled from the carbonaceous material in processes involving indirect heating are brought into contact with surfaces having a temperature higher than the hydrocarbons themselves, and the hydrocarbons are thus subjected to a cracking action with the resultant formation of hot carbon and lighter hydrocarbons. The hot carbon thus formed is of different nature from the carbon left by driving off the volatile material from the original carbonaceous matter. It appears to be graphitic in character, but whatever its character is not active nor activatable. Carbon thus formed tends to deposit on the surface of activated or activatable carbon in the charge, thereby masking these substances and reducing the activity of the product. Moreover, the carbon formed by cracking of the hydrocarbons tends to deposit in the pores in the char. The consequent reduction in porosity deleteriously affects the product.

As a result of my investigations, I have discovered that the aforementioned difficulties encountered in the production of char by indirect heating may be overcome in large measure by direct heating of the raw carbonaceous material to produce char, the heating being accomplished by passing a hot substantially non-oxidizing gas through a porous mass of the raw carbonaceous material and by maintaining a pressure differential along the path of the gas such that the gas disperses throughout the material with substantial uniformity, gives up its heat to all portions of the material, and raises the temperature of all portions of the material at substantially the same rate and to substantially the same point. Thermal gradients throughout the charge are thereby substantially eliminated, and the distilled hydrocarbons do not come into contact with surfaces which are substantially hotter than they are. Cracking of the hydrocarbons and consequent formation of unactivated and unactivatable carbon is thereby inhibited.

I have also discovered that heating of the material to be carbonized by passing hot gas in contact with substantially all portions of it, as described above, greatly facilitates the control of the operation and permits the production of a much greater proportion of activated and activatable carbon than does the prior practice involving indirect heating. Thus, when passing hot gas through all portions of the material to be carbonized at a rate such that all portions of the material are at substantially the same temperature at any instant, it is not necessary to maintain any particular rate of evolution of volatile matter from material at any stage in the operation.

My invention is applicable to the production of activated carbon from wood, coal and other solid carbonaceous materials and is particularly valuable for coking coal containing volatile matter of such character that a small proportion of it is removable in a wide first temperature range and a relatively larger proportion is removable in a relatively narrow but more elevated second temperature range. I have found that coal of this character can be coked to produce a large proportion of activated and activatable carbon without maintaining any particular rate of volatile evolution provided that the temperature rise throughout all portions of the coal during coking occurs with substantial uniformity, such uniformity being obtained by passing hot gases through a porous mass of the body while maintaining a gas pressure differential through the body such that the gas distributes throughout the body and heats all portions equally I have also discovered that the character of the gas employed to introduce heat throughout the carbonaceous material during the carbonizing of the latter is of importance. Obviously the gas employed should be substantially non-oxidizing in character, otherwise the carbonaceous material will burn and become wasted. However, I have discovered that non-oxidizing character is not the only important feature. The gas employed should have a high specific heat and for this reason superheated steam and hydrogen are desirable constituents of the gas. The high specific heat of these gases permits the removal of a volatile matter with a relatively small proportion of hot gas and at relatively low temperatures.

A still more important discovery with respect to coking by direct transfer of heat from gas to the carbonaceous materials during the manufacture of activated carbon is that the heating with the gas should occur in the presence of carbon monoxide and preferably in an atmosphere containing a large proportion of carbon monoxide.

The presence of carbon monoxide within the mass to be carbonized during the passage of the hot gases therethrough may be assured by passing through the body hot carbonaceous gas capable of producing carbon monoxide within the mass. Thus the presence of carbon monoxide in contact with carbonaceous material during the direct heating thereof by a gaseous medium may be assured by employing ordinary water gas containing a high percentage of carbon monoxide and hydrogen, or producer gas which has a high content of carbon monoxide. It is also possible to employ hydrocarbon gases of such character and under such conditions that during the passage of these gases through the mass carbon monoxide is formed.

I attribute the value of heating the carbonaceous material by direct contact with hot gases and in the presence of carbon monoxide to the dissociation of the carbon monoxide within the mass to form solid carbon and carbon dioxide, the carbon thus formed being deposited in the mass and the carbon dioxide being evolved therefrom. I believe that the carbon thus deposited is of a very active form. However, whatever be the explanation, the fact remains that the presence of relatively large concentration of carbon monoxide during the heating of the carbonaceous material by direct contact with hot gases to remove volatile substances, results in a marked increase in the proportion of activated and activatable carbon produced. In this connection it should be noted that the reaction

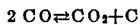

is a reversible one. In going to the right, i. e., to form $CO_2$ and $C$, the reaction is exothermic, and in going to the left to form $CO$, the reaction is endothermic. My observations indicate that the reaction goes in the desired direction, i. e., to the right, when a charge derived from sub-bituminous coal is held at temperatures ranging from about 500° F. to about 1100° F.

At charge temperatures in the neighborhood of 1150° F., the reaction tends to reverse and so to form $CO$ at the expense of $CO_2$ and $C$. This is accompanied by a consumption of heat, and is therefore undesirable for a plurality of reasons.

It is therefore my preferred practice to heat the charge in contact with carbon monoxide to a temperature ranging from 500° F. to less than 1150° F. by drawing hot gases through the charge.

The fact that the carbon resulting from the dissociation of carbon monoxide is activated or activatable permits the activation of masses other than carbonaceous ones. Thus by drawing $CO$ through an inert porous mass of material such as silica under such conditions that carbon is deposited therein, it is possible to produce a mass which may be activated like a char formed by the destructive distillation of wood and the like. In order to initiate the dissociation of $CO$ under such conditions it may be necessary to employ extraneous catalysts, for example ferric oxide. It is my belief that in the case where $CO$ dissociates in the presence of char, the active carbon already formed acts as a catalyst to promote dissociation. In the absence of char, some other catalyst should be supplied.

However, because carbonaceous materials are themselves cheap, and since it is probable that the nascent carbon in the char acts as a catalyst to promote dissociation, I prefer to employ coal, wood, etc., as the raw material from which to form a char that will act as a carrier for the carbon deposited by the dissociation of carbon monoxide.

If desired the $CO$ may be brought into contact with the char after the volatile matter has been distilled therefrom in whole or in part, and will have an equally beneficial effect. Thus coal or wood can be partially coked by drawing superheated steam through a porous mass thereof, $CO$ being drawn through the mass thereafter at temperatures at which it tends to dissociate to form $C$ and $CO_2$. The treatment with $CO$ in this manner increases the yield of activated carbon just as does treatment with $CO$ during the removal of the volatile. However, such a multi-step process involves unnecessary handling or other complications and ordinarily will not be desirable.

My invention will be more clearly understood in the light of the following detailed description taken in conjunction with the accompanying drawings, in which Fig. 1 is a schematic diagram of an apparatus for the practice of my invention employing superheated steam as the heating medium.

Fig. 2 is a diagram of a preferred form of apparatus for practicing my invention employing producer gas as a source of carbon monoxide and as the heating medium to accomplish the removal of the volatile matter and employing steam for the activation of the resulting char; and Fig. 3 represents a modified form of the apparatus of Fig. 2 in which carbon monoxide gas produced in the activation of the char with superheated steam is employed as a heating medium in the step in which the char is formed by removal of the volatiles from the raw carbonaceous material.

The apparatus of Fig. 1 comprises a volatilization chamber 10 in the form of an elongated upright cylinder disposed within an upright flue 11 of any convenient form. Outside the flue near its base is disposed a superheater 12 of any convenient construction such as a pipe coil disposed inside a firebox. Steam is introduced into the superheater through a pipe 13 and passes therethrough to an exit pipe 14 from which in turn it is discharged into a compartment 15 in the lower portion of the cylinder 10. The upper wall of the compartment 15 is a sloping plate 16 which forms the bottom of a chute 17 through which material may be withdrawn from the chamber 10. One or more vertical perforated tubes 18, 18' communicate at their lower ends with the compartment 15 and permit superheated steam to be discharged into the volatilization chamber.

At the upper end of the volatilization chamber an oblique inlet pipe 19 provided with a cap 20 is disposed for the purpose of admitting carbonaceous material, say bituminous coal, into the chamber. The upper portion of the volatilization chamber is also provided with a bleeder outlet 21 for the removal of gases.

In place of the flue 11, heat insulating media may be employed. However, I prefer to accomplish the insulating effect by passing flue gases through the flue surrounding the volatilization chamber thereby preventing excessive dissipation of heat from the interior of the chamber. Flue gas from any convenient source may be introduced for this purpose through an inlet 33 and withdrawn from an outlet 34 disposed respectively at lower and upper portions of the flue.

The chute 16 discharges through a valved pipe 22 and an obliquely disposed conduit 23 into an upright activator cylinder 24. The activator cylinder is similar in construction to the volatilization chamber and has a sloping baffle 25 which forms the top of a steam box 26 and the bottom of a discharge chute 27, which may be sealed by a valve 27'. Steam for activating material within the cylinder 24 is introduced through a pipe 28, a superheater 29 and superheater exit pipe 30 into the box 26 and thence enters the cylinder through one or more upright perforated pipes 31, 31' which communicate at their lower ends with the box 26.

A bleeder 35 for removing gases from the activator chamber communicates therewith near its top.

A flue 36 surrounds the activator cylinder and is provided with inlet 37 and outlet 38 for passing hot gases therethrough. The flue 36 is similar to that surrounding the volatilization chamber and may be replaced by heat insulation, if desired.

In the operation of the apparatus of Figure 1, a batch of the material to be carbonized, say bituminous coal of a size ranging from 6 to 8 mesh, is allowed to fill the chamber 10 and there heated with superheated steam until substantially all of the volatile matter has been eliminated and a char containing activated and activatable carbon is formed. During the heating the chamber is sealed except at the steam inlet and the bleeder 21. The resulting char is charged as a batch into the activator cylinder where it is again treated with superheated steam and is afterward discharged for use. The activator cylinder is sealed during use, at the inlet 22 and the outlet 27'.

Passing now to a consideration of the apparatus of Fig. 2, it will be seen that this apparatus is similar to that of Fig. 1, except that the superheater for supplying steam to the volatilization chamber is replaced by a gas producer 60 which may be of any of the well-known designs so long as it produces hot gas of non-oxidizing character with a high content of carbon monoxide.

The operation of the apparatus of Fig. 2 is similar to that of Fig. 1. Carbonaceous material from which volatile constituents are to be removed to form a char is charged as a batch into the volatilization chamber 10 through the pipe 19. With the chamber substantially full of material to be carbonized and with the inlet 19 and the outlet 17 closed, hot producer gas is admitted into the volatilization chamber through the perforated pipes 18, 18'. The gas passes through the charge and escapes through the bleeder 21. After the batch has been formed into a char it is discharged into the activator cylinder 24 and with the inlet 23 closed and the outlet 27' closed, superheated steam is admitted into the activator cylinder through the perforated tubes 31, 31' and passes through the charge to the bleeder 35. As in the case of the apparatus of Fig. 1, flue gas is passed through the flues surrounding both the volatilization chamber and the activator cylinder during use to prevent excessive dissipation of heat therefrom.

The apparatus of Fig. 3 is similar to that of Fig. 2 except that the exit gas passing through the bleeder from the activating cylinder is passed into a cyclone separator 50 and thence through conduit 51 into the compartment 15, at the base of the volatilization chamber. During activation, carbon monoxide gas is formed, and this carbon monoxide gas, after separation from solids which accompany it, is used to supply heat and carbon monoxide to the volatilization chamber.

During activation, the char suffers a decrease in density, and it is possible to tell accurately from the density of the material its degree of activation. Thus, for example, char having a density of .5 when introduced into the activating cylinder may decrease in density to .35 when it is properly activated. By maintaining a proper velocity of steam introduced into the activating cylinder and a suitable particle size of the char the activated carbon will be removed when it has attained a certain density and a certain degree of activation. The finely divided activated carbon is thus swept out with the exhaust gases through the bleeder and there collected.

In certain instances it may be possible to dispense entirely with the gas producer in the apparatus of Fig. 3 provided that sufficient heat is available in the exhaust gases from the activator cylinder together with a sufficient carbon monoxide content.

It is also possible to operate the process by using flue gases derived from the combustion of coal or the like provided that these gases contain a relatively high content of carbon monoxide. In this case the flue gases are admitted to the compartment 15 and thence into the volatilization chamber either with or without superheated steam.

Test I

The following exemplifies the practice of the invention with a Colorado sub-bituminous coal containing 39.7% of volatile matter. The coal used for the charge had a particle size ranging from about 4 to about 10 mesh. This material was charged into the vaporizing chamber or carbonizing retort when the inside temperature of the retort and the temperature of the surrounding flues were about 800° F. Immediately after charging, the flue temperatures were reduced to about 600° F. Non-oxidizing gas containing about 6% CO and having a temperature of about 1500° F. was introduced into the vaporizing chamber and carried out through the bleeder pipe. The charge in the vaporizing chamber had a depth of about 5 feet, and the outlet pressure from the vaporizing chamber was lower than the inlet pressure by about 7 inches of water.

When the temperature of the charge reached the point at which distillation began to occur (say 150 to 200° F.) a heavy flow of hot flue gas at a temperature of 1400 to 1600° F. was passed through the vaporizing chamber and the temperature of the charge was increased rapidly to about 600° F. At this temperature a considerable positive heat of reaction developed within the charge, and to prevent the charge temperature from rising excessively, superheated steam was admitted in place of part of the carbon monoxide-containing gases. The temperature of the charge was allowed to rise to about 1100° F. at which temperature practically all of the volatile matter was distilled out. The heating of the material in the vaporizing chamber consumed about 5 hours.

The char thus formed in the vaporizing chamber was then dropped into the activating cylinder where it was heated to 1650° F. as rapidly as possible by conduction through the wall of the activating cylinder. When the temperature of the charge reached 1650° F. in the activating cylinder superheated steam was passed through it for a period of three hours, during which time the temperature was maintained in the neighborhood of 1650° F. The steam in the activation step reacted with carbon to form carbon monoxide and hydrogen.

The activated carbon thus formed had an activity of about 57 as measured by the iodine index and an ash content of about 12.5%.

Test II

A test was conducted with the same Colorado sub-bituminous coal having a similar particle size employing superheated steam (1700° F.) in the vaporizing chamber without the introduction of carbon monoxide. The charge was heated as rapidly as possible to 1100° F. and held at this temperature for about an hour. The resulting char was then activated with steam to produce a material having an activity of 30 as measured by the iodine index and an ash content of 7.5%.

Test III

Tests precisely similar to Test II were run except that water gas (1700° F.) was employed instead of steam in the vaporizing chamber and material which was thus coked in one hour at temperatures not to exceed 1100° F. and subsequently activated with superheated steam showed an activity of 66 as measured by the iodine index and an ash content of 9.0%. These tests show the remarkable advantage which accrues to the use of gases containing carbon monoxide.

Test IV

In another series of tests, Colorado sub-bituminous coal was coked by passing superheated steam therethrough for a period of several hours at a temperature not to exceed 1100° F. The material was thereafter activated at a temperature of 1650° F. for three hours in the presence of steam. The material thus activated showed an activity of about 57 as measured by the iodine index with an ash content of 13.5%.

The carbon thus activated was then treated by passing water gas through it at a temperature ranging from 570 to 600° F. for a period of three hours and then reactivated with steam at a temperature of 1650° F. for a period of two hours. The reactivated material showed an activity of 72 as measured by the iodine index and an ash content of 13.5%.

The material was then re-treated a second time. In this second re-treatment water gas was again drawn through it for three hours while the temperature was maintained at 570 to 600° F., and then the material was reactivated again with steam for a period of two hours at a temperature of 1650° F. The final product of this operation showed an activity of 114 by the iodine test. Thus from sub-bituminous coal there was produced activated carbon with an activity greater than that of gas mask charcoal produced from cocoanut hulls.

It will be understood that the operation of my invention is not limited to temperatures of 500° F. to 1100° F., this being the preferred range of operation. With certain classes of carbonaceous material, it may well be that the dissociation of carbon monoxide under the influence of a catalyst may take place at temperatures outside the aforementioned range.

I claim:

1. In a process for producing activated carbon involving the heating of solid carbonaceous material to expel volatile ingredients therefrom and to form a char, the improvement which comprises heating a batch of the carbonaceous material by introducing thereinto at a plurality of points and passing therethrough a hot gas containing a substantial portion of carbon monoxide, the temperature of all portions of the batch being raised at substantially the same rate so that substantially no thermal gradient is set up between any two portions of the batch and the temperature of substantially all portions of the batch being raised to a point at which said ingredients are volatile but at which the carbon monoxide dissociates to form carbon and carbon dioxide.

2. In a process for producing activated carbon involving the heating of solid carbonaceous material to expel volatile ingredients to form a char, the improvement which comprises heating a batch of said material by passing thereinto at a plurality of points and therethrough a hot gas containing a substantial proportion of carbon monoxide, the temperature of all portions of the mass being raised by said heating at substantially the same rate so that all parts of the mass are equally hot at a given instant, and maintaining the temperature of substantially all parts of the mass by said heating between 500° F. and 1100° F. until the volatile ingredients have been expelled.

3. In a process for producing activated carbon involving the heating of solid carbonaceous material to expel volatile ingredients therefrom to form a char, the improvement which comprises heating a batch of said material by passing thereinto at a plurality of points and therethrough a hot gas containing a substantial proportion of carbon monoxide and raising the temperature of all portions of the batch by said heating at substantially the same rate so that substantially no thermal gradient is set up within the batch, the temperature to which all portions of the mass is raised being such that said ingredients are volatalized and carbon monoxide is dissociated to carbon dioxide and carbon, subsequently passing superheated steam through the resulting batch of char with resultant formation of carbon monoxide and introducing said carbon monoxide into a second batch of the carbonaceous material while said second batch is being heated to expel volatile ingredients therefrom.

4. In a process for producing activated carbon involving the heating of solid carbonaceous material to expel volatile ingredients therefrom to form a char, the improvement which comprises heating a batch of said material by passing thereinto at a plurality of points and therethrough a hot gas containing a substantial proportion of carbon monoxide, raising the temperature of all portions of the batch by said heating at substantially the same rate and without developing a substantial thermal gradient between any portions of the mass, conducting said heating until the temperature of substantially all portions of the mass have risen to a point at which the volatile ingredients are expelled and at which carbon monoxide dissociates to form carbon and carbon dioxide and depositing said carbon within the resulting char.

5. In a process for producing activated carbon involving the heating of solid carbonaceous material to expel volatile ingredients therefrom to form a char, the improvement which comprises heating a batch of said material by passing thereinto at a plurality of points and therethrough a hot gas containing a substantial proportion of carbon monoxide, raising the temperature of all portions of the batch by said heating at substantially the same rate so that substantially no thermal gradient is set up throughout the mass and continuing the heating until substantially all portions of the mass are raised to a temperature at which the volatile ingredients are expelled and the carbon monoxide is dissociated to form carbon and carbon dioxide, activating the resulting char from which the volatile material has been expelled by passing superheated steam through a batch of the resulting char to bring about activation and to cause particles of the activated carbon to be entrained and carried out of said batch, physically separating the gas given off from the activated carbon entrained therein, and subjecting another batch of carbonaceous material to heating in the presence of carbon monoxide gas driven off from the first batch as the result of the activation with steam.

6. In a process for producing activated carbon which involves forming a char by expelling volatile matter from carbonaceous material and activating said char by contact with hot gas, the improvement which comprises heating coal containing volatile matter of such character that a small proportion of it is removable in a wide first temperature range and a relatively large proportion of it is removable in a relatively narrow but more elevated second temperature range by introducing hot gas containing a substantial proportion of carbon monoxide at a plurality of points into a porous batch of the coal and raising the temperature of all portions of the batch by said heating at substantially the same rate and without the development of any substantial thermal gradient between any two different parts of the batch, the temperature of all portions of the batch being raised by said heating to a point ranging from about 500° F. to about 1100° F., so that the volatile matter is distilled from the coal leaving activatable carbon and additional activatable carbon is deposited in the batch due to the decomposition of carbon monoxide.

KENNETH BARTON STUART.